US009309800B2

(12) United States Patent
Adupala et al.

(10) Patent No.: US 9,309,800 B2
(45) Date of Patent: Apr. 12, 2016

(54) EXHAUST SYSTEM FOR AN OFF-ROAD VEHICLE

(71) Applicant: CNH America LLC, New Holland, PA (US)

(72) Inventors: Rajeshwar R. Adupala, Naperville, IL (US); Daniel A. Morey, Mundelein, IL (US); William Schroeder, Downers Grove, IL (US)

(73) Assignee: CNH Industrial America LLC, New Holland, PA (US)

( * ) Notice: Subject to any disclaimer, the term of this patent is extended or adjusted under 35 U.S.C. 154(b) by 160 days.

(21) Appl. No.: 14/122,629

(22) PCT Filed: Sep. 30, 2013

(86) PCT No.: PCT/US2013/062697
§ 371 (c)(1),
(2) Date: Nov. 26, 2013

(87) PCT Pub. No.: WO2014/084959
PCT Pub. Date: Jun. 5, 2014

(65) Prior Publication Data
US 2014/0331658 A1 Nov. 13, 2014

Related U.S. Application Data

(60) Provisional application No. 61/732,073, filed on Nov. 30, 2012.

(51) Int. Cl.
*F01N 3/05* (2006.01)
*F01N 13/08* (2010.01)
*F01N 13/00* (2010.01)
*F01N 3/10* (2006.01)
*F01N 3/038* (2006.01)
*F01N 3/20* (2006.01)
*F01N 3/035* (2006.01)

(52) U.S. Cl.
CPC .............. *F01N 13/08* (2013.01); *F01N 13/008* (2013.01); *F01N 13/082* (2013.01);
(Continued)

(58) Field of Classification Search
CPC ............. F01N 3/038; F01N 3/05; F01N 3/10; F01N 13/008; F01N 13/082; F01N 13/085; F01N 2240/20; F01N 2260/022; F01N 2260/26; F01N 2470/02; F01N 2470/08; F01N 2470/24; F01N 2470/30; F01N 2560/02; F01N 2590/08
USPC ........... 60/276, 297, 299, 301, 309, 311, 319, 60/320
See application file for complete search history.

(56) References Cited

U.S. PATENT DOCUMENTS 4,020,915 A * 5/1977 Darnell et al. ................ 180/309
4,265,332 A 5/1981 Presnall et al.
(Continued)

FOREIGN PATENT DOCUMENTS

WO 2009025658 A1 2/2009

OTHER PUBLICATIONS

PCT International Search Report and Written Opinion mailed Dec. 16, 2013.

*Primary Examiner* — Thomas Denion
*Assistant Examiner* — Jorge Leon, Jr.
(74) *Attorney, Agent, or Firm* — Sue C. Watson

(57) ABSTRACT

An exhaust system for an off-road vehicle including an outlet port configured to release exhaust gas and an outlet stack disposed about the outlet port, in which at least a portion of the outlet stack is radially spaced from the outlet port to form a gap between the outlet stack and the outlet port. The outlet stack is configured to direct a flow of exhaust gas from the outlet port toward a distal end of the outlet stack. The exhaust system further includes an exhaust shield in close proximity or coupled to the outlet stack comprising at least one opening and an electronic control unit (ECU) disposed within the exhaust shield. The gap is configured to establish an airflow path from the at least one opening to a region of the outlet stack downstream from the outlet port, and the ECU is positioned within the airflow path between the at least one opening and the gap to facilitate cooling of the ECU.

14 Claims, 6 Drawing Sheets

(52) U.S. Cl.
CPC .............. *F01N 13/085* (2013.01); *F01N 3/035* (2013.01); *F01N 3/038* (2013.01); *F01N 3/05* (2013.01); *F01N 3/10* (2013.01); *F01N 3/2066* (2013.01); *F01N 2240/20* (2013.01); *F01N 2260/022* (2013.01); *F01N 2260/20* (2013.01); *F01N 2260/26* (2013.01); *F01N 2270/02* (2013.01); *F01N 2270/08* (2013.01); *F01N 2470/00* (2013.01); *F01N 2470/02* (2013.01); *F01N 2470/08* (2013.01); *F01N 2470/24* (2013.01); *F01N 2470/30* (2013.01); *F01N 2560/02* (2013.01); *F01N 2560/021* (2013.01); *F01N 2560/026* (2013.01); *F01N 2590/08* (2013.01); *F01N 2900/00* (2013.01)

(56) References Cited

U.S. PATENT DOCUMENTS

| | | | |
|---|---|---|---|
| 4,487,289 A | 12/1984 | Kicinski et al. | |
| 4,638,632 A * | 1/1987 | Wulf et al. | 60/319 |
| 4,741,411 A | 5/1988 | Stricker | |
| 6,832,665 B2 | 12/2004 | Crombeen | |
| 7,587,894 B2 | 9/2009 | Kang et al. | |
| 7,628,012 B2 | 12/2009 | Eifert et al. | |
| 7,743,604 B1 * | 6/2010 | Albanesi | 60/287 |
| 7,793,495 B2 | 9/2010 | Bradley et al. | |
| 2005/0153251 A1 * | 7/2005 | Crawley et al. | 431/1 |
| 2009/0071136 A1 | 3/2009 | Smith | |
| 2009/0084083 A1 * | 4/2009 | Vachon et al. | 60/273 |
| 2009/0139217 A1 * | 6/2009 | Eifert et al. | 60/317 |
| 2010/0043412 A1 * | 2/2010 | Dickinson et al. | 60/317 |
| 2010/0242460 A1 * | 9/2010 | Sponsky et al. | 60/320 |
| 2011/0192153 A1 | 8/2011 | Schmidt | |
| 2012/0048631 A1 * | 3/2012 | Shatters et al. | 180/68.1 |
| 2012/0103712 A1 * | 5/2012 | Stanek et al. | 180/68.1 |
| 2012/0124980 A1 * | 5/2012 | Prenger et al. | 60/319 |
| 2012/0125271 A1 * | 5/2012 | Bada Ghar Wala | 123/41.04 |
| 2012/0145268 A1 * | 6/2012 | Clarke et al. | 138/40 |
| 2013/0161112 A1 * | 6/2013 | Grzesiak et al. | 180/309 |
| 2014/0106659 A1 * | 4/2014 | Hong et al. | 454/162 |
| 2014/0182718 A1 * | 7/2014 | Wolfcarius et al. | 137/561 A |

* cited by examiner

EXHAUST SYSTEM FOR AN OFF-ROAD VEHICLE

CROSS REFERENCE TO RELATED APPLICATION

This application claims priority from and the benefit of U.S. Provisional Patent Application Ser. No. 61/732,073, entitled "EXHAUST SYSTEM FOR AN OFF-ROAD VEHICLE", filed Nov. 30, 2012, which is hereby incorporated by reference in its entirety.

BACKGROUND

The present disclosure relates generally to off-road vehicles with diesel engines, and more particularly, to an exhaust system configured to direct an exhaust flow away from the diesel engine.

Certain off-road vehicles are powered by diesel engines and produce exhaust gas. The exhaust gas may include undesirable byproducts such as nitrogen oxides (NOx), carbon monoxide, and particulate material. Government regulations have continually reduced the acceptable concentrations of these byproducts, specifically in relation to NOx and $NH_3$. Certain off-road vehicles include an exhaust system that monitors the concentration of the byproducts via sensors positioned within the exhaust system. These sensors may be connected to an electronic control unit (ECU) that processes and/or stores data from the sensors. Due to the low operating voltage, the ECU may be positioned in close proximity to the sensors. As a result, the ECU may be located within an undesirably hot region of the exhaust system. In addition, the sensors used to monitor the emissions in the exhaust gas may be susceptible to moisture. For example, water (e.g. from rain) that enters the exhaust stack may contact the sensor, thereby interfering with emissions measurements.

Furthermore, foreign debris may build up within the exhaust system, thereby interfering with airflow configured to cool the exhaust system. As a result, certain portions of the exhaust system may become undesirably hot. Exhaust system overheating may increase wear on exhaust components and/or reduce exhaust system efficiency.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an exhaust system for an off-road vehicle includes an outlet port configured to release exhaust gas and an outlet stack disposed about the outlet port, in which at least a portion of the outlet stack is radially spaced from the outlet port to form a gap between the outlet stack and the outlet port. The outlet stack is configured to direct a flow of exhaust gas from the outlet port toward a distal end of the outlet stack. The exhaust system further includes an exhaust shield in close proximity or coupled to the outlet stack comprising at least one opening and an electronic control unit (ECU) disposed within the exhaust shield. The gap is configured to establish an airflow path from the at least one opening to a region of the outlet stack downstream from the outlet port, and the ECU is positioned within the airflow path between the at least one opening and the gap to facilitate cooling of the ECU.

In a second embodiment, an exhaust system for an off-road vehicle includes a housing having a body and an outlet port extending upwardly from the body, in which the outlet port is configured to release exhaust gas, and the body extends radially outward beyond the outlet port. The exhaust system further includes a sensor coupled to the outlet port and configured to monitor a level of at least one component of the exhaust gas. The exhaust system further includes an outlet stack disposed about the outlet port, in which at least a portion of the outlet stack is radially spaced from the outlet port to form a gap between the outlet stack and the outlet port. The outlet stack includes a base extending radially outward beyond the body of the housing and a tube extending upwardly from the base, in which the base is sloped away from the tube. The gap is configured to facilitate a flow of moisture from an inner surface of the tube to an inner surface of the base. The base is configured to direct the moisture to a region radially outward from the body away from the outlet port and the sensor.

In a third embodiment, an exhaust system for an off-road vehicle includes an outlet port configured to release exhaust gas and an outlet stack disposed about the outlet port, in which at least a portion of the outlet stack is radially spaced from the outlet port to form a gap between the outlet stack and the outlet port. The outlet stack is configured to direct a flow of exhaust gas from the outlet port toward a distal end of the outlet stack. The exhaust system further includes an exhaust shield having at least one opening and an electronic control unit (ECU). The at least one opening is configured to aspirate air from outside the exhaust system, through the gap, and into a region of the outlet stack downstream from the outlet port to establish a cooling airflow over the ECU.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
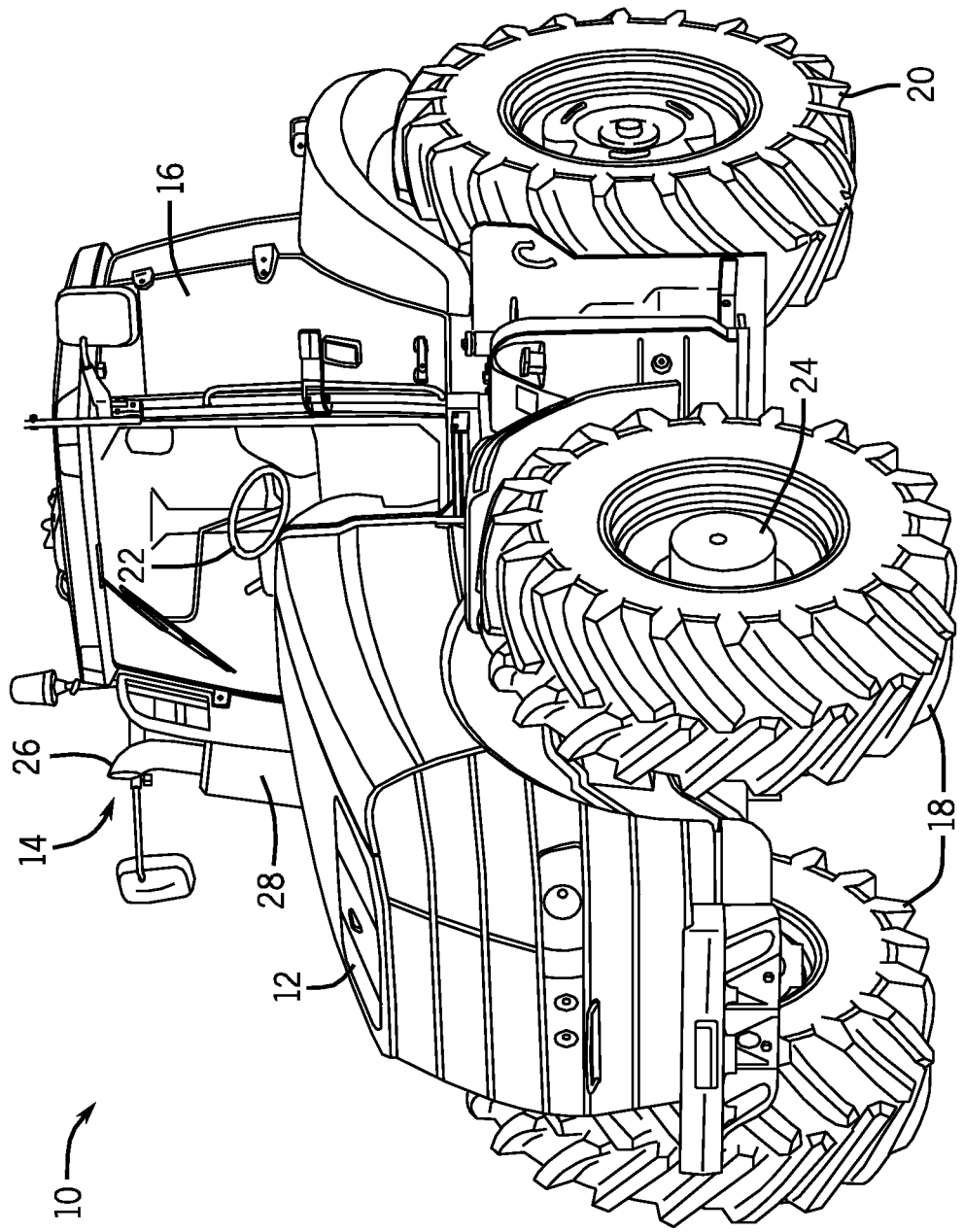
FIG. 1 is a perspective view of an embodiment of an off-road work vehicle that employs an exhaust system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include an exhaust system for a diesel engine of an off-road vehicle. To monitor the concentration of expelled byproducts (e.g., NOx and NH3), exhaust systems may use one or more sensors and an electronic control unit (ECU). Because of the low voltages used in the sensors and the ECU, the ECU may be placed in close proximity to the sensors to enhance signal strength and to reduce wire fatigue. However, placing the ECU close to the sensor may expose the ECU to undesirably hot portions of the exhaust system. In addition, moisture ingress into the exhaust system may interfere with moisture-sensitive sensors. Furthermore, debris may enter the exhaust system, thereby interfering with cooling airflow and increasing exhaust temperature.

The disclosed embodiments provide an exhaust system for an off-road vehicle including an outlet port configured to release exhaust gas and an outlet stack disposed about the outlet port, in which at least a portion of the outlet stack is radially spaced from the outlet port to form a gap between the outlet stack and the outlet port. The outlet stack is configured to direct a flow of exhaust gas from the outlet port toward a distal end of the outlet stack. The exhaust system further includes an exhaust shield in close proximity or coupled to the outlet stack comprising at least one opening and an electronic control unit (ECU) disposed within the exhaust shield. The gap is configured to establish an airflow path from the at least one opening to a region of the outlet stack downstream from the outlet port, and the ECU is positioned within the airflow path between the at least one opening and the gap to facilitate cooling of the ECU. With a decoupled outlet stack and outlet port, the exhaust system utilizes the Venturi effect to create a low pressure region in the exhaust system. The low pressure region draws cooler surrounding air from outside the exhaust system into and through the exhaust system. The air flow through the exhaust system flows over the electronic components to keep them cool. In addition to its cooling effect, the air flow also carries away debris that collects in the exhaust system.

Another embodiment provides an exhaust system for an off-road vehicle including a housing having a body and an outlet port extending upwardly from the body, in which the outlet port is configured to release exhaust gas, and the body extends radially outward beyond the outlet port. The exhaust system further includes a sensor coupled to the outlet port and configured to monitor a level of at least one component of the exhaust gas. The exhaust system further includes an outlet stack disposed about the outlet port, in which at least a portion of the outlet stack is radially spaced from the outlet port to form a gap between the outlet stack and the outlet port. The outlet stack includes a base extending radially outward beyond the body of the housing and a tube extending upwardly from the base, in which the base is sloped away from the tube. The gap is configured to facilitate a flow of moisture from an inner surface of the tube to an inner surface of the base. The base is configured to direct the moisture to a region radially outward from the body away from the outlet port and the sensor. The decoupled outlet stack and outlet port keeps moisture out of the outlet port and away from the moisture-sensitive sensors by guiding the moisture down the sides of the outlet stack and out of the exhaust system.

FIG. 1 is a perspective view of an embodiment of an off-road work vehicle 10 that employs an exhaust system 14 for a diesel engine. In certain embodiments, the off-road vehicle 10 may be a tractor, work vehicle, or any other suitable vehicle that may incorporate an exhaust system for a diesel engine. The illustrated vehicle 10 has a body 12 that houses an engine, transmission, cooling system, and power train (not separately shown). The body 12 also houses a portion of an exhaust system 14. Further, the off-road work vehicle 10 has a cabin 16 where an operator may sit or stand to operate the vehicle 10. The vehicle 10 has two front wheels 18 and two rear wheels 20 that rotate to move the vehicle 10. As will be appreciated, the vehicle 10 is maneuvered using a steering wheel 22 that induces the front wheels 18 to turn. As illustrated, the wheels 18 are coupled to an axle 24 (e.g., fixed or suspended) that supports the wheels 18, and facilitates wheel rotation. The exhaust system 14 includes an outlet port that releases exhaust gas, and an outlet stack 26, which carries the exhaust gas away from the vehicle 10. The exhaust system 14 also includes a shield 28 configured to block contact with hot exhaust components. In the illustrated embodiment, the exhaust system 14 is coupled to an A-pillar of the off-road vehicle 10. However, it should be appreciated that the exhaust system 14 may be positioned within other areas of the vehicle 10 in alternative embodiments.

Figure 2:
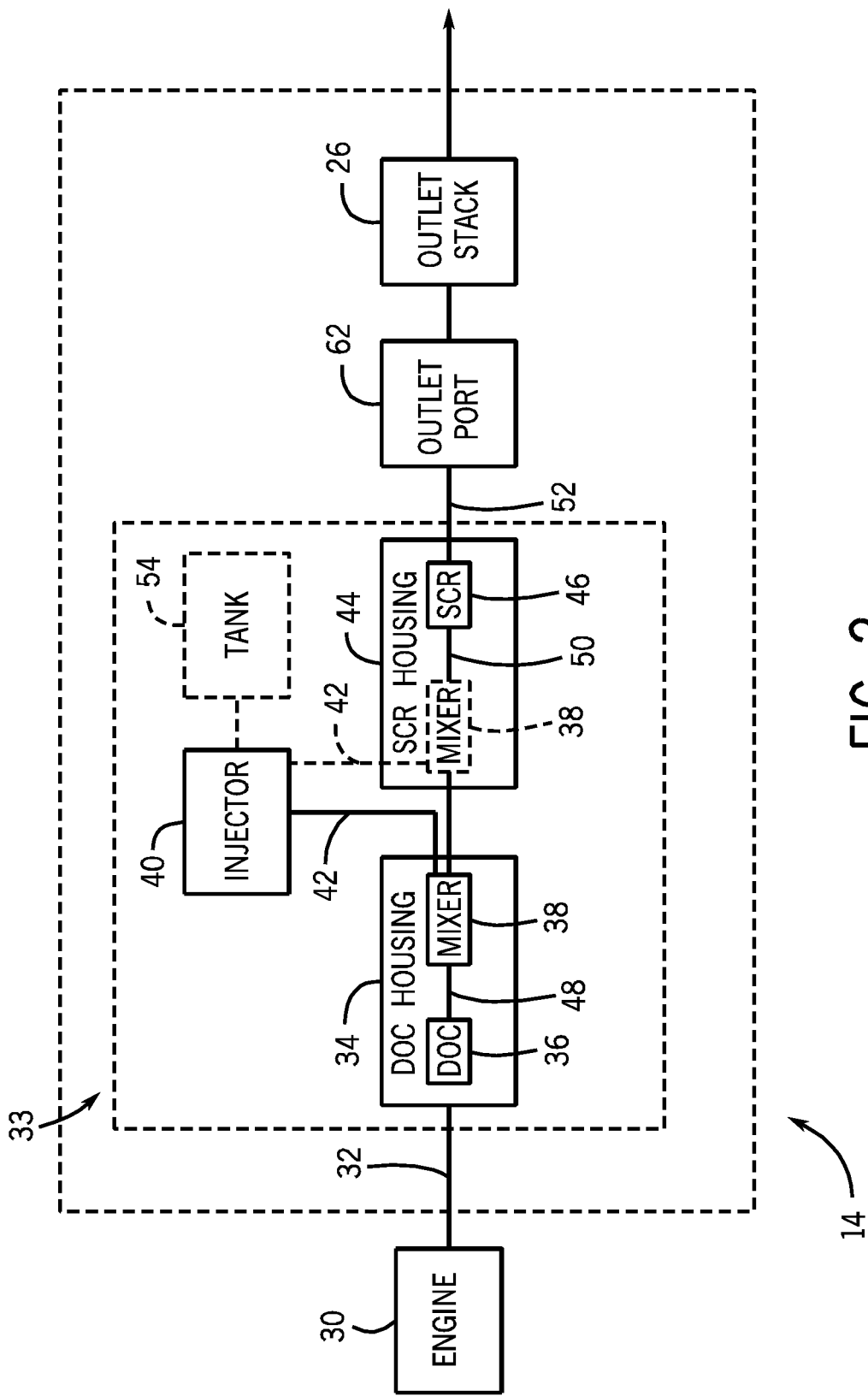
FIG. 2 is a schematic diagram of an embodiment of an exhaust system that may be used within the off-road work vehicle of FIG. 1.

FIG. 2 is a schematic diagram of an embodiment of an exhaust system that may be used within the off-road work vehicle of FIG. 1. In the illustrated embodiment, an engine 30 expels exhaust 32 to the exhaust system 14. The illustrated embodiment of the exhaust system 14 includes an after-treatment system (ATS) 33 to reduce emissions from the off-road vehicle. The ATS includes a diesel oxidation catalyst (DOC) assembly having a housing 34 containing a DOC 36 and a mixer 38. The ATS also includes an injector 40 for injecting diesel exhaust fluid (DEF) 42, and a selective catalytic reduction (SCR) housing 44 containing an SCR module 46. In some embodiments, the mixer 38 may be disposed within the SCR housing 44 instead of, or in addition to, the DOC housing 34. Certain embodiments of the exhaust system 14 may additionally include a diesel particulate filter to capture particulate matter, a muffler, or any other element suitable for use in an exhaust system.

The DOC housing 34 receives exhaust 32, and directs the exhaust 32 into the DOC 36. The DOC 36 receives the exhaust and catalyzes the oxidization of carbon monoxide to carbon dioxide by using excess oxygen in the exhaust 32. Similarly, the DOC 36 uses excess oxygen to catalyze the conversion of hydrocarbons to water and carbon dioxide. Thus, the DOC 36 receives raw exhaust 32 and outputs catalyzed exhaust 48 with reduced concentrations of hydrocarbons and carbon monoxide. The DOC housing 34 directs the exhaust 48 to the mixer 38, which is enclosed within the DOC housing 34. The mixer 38 also receives the DEF 42 from the injector 40, in addition to the exhaust 48 from the DOC 36. In certain embodiments, the exhaust system 14 includes a tank 54 for containing the DEF 42, and supplying the DEF to the injector 40. Alternatively, the injector 40 may include a tank 54 containing DEF 42. In further embodiments, the tank 54 containing the DEF 42 may be remote from the injector 40. In certain embodiments, the mixer 38 may be disposed within SCR housing 44, a separate housing, or any other housing suitable for containing the mixer 38.

The injector 40 sprays the DEF 42 into the exhaust 48 within the mixer 38. The DEF 42 is a solution used to aid in the reduction of NOx from the exhaust 48. For example, in certain embodiments, the DEF 42 may be an aqueous urea solution which undergoes thermal decomposition and hydrolysis within the exhaust system 14 to produce ammonia, which the SCR uses to convert the NOx into nitrogen and water. Thus, the mixer 38 supplies well-mixed exhaust solution 50 to the SCR module 46. The SCR module 46 receives the exhaust solution 50 and uses the distributed DEF 42 to reduce the NOx concentration in the exhaust gas. Finally, the SCR module 46 sends processed exhaust 52 with a reduced NOx concentration through an outlet port 62 and the outlet stack 26 into the atmosphere.

Figure 3:
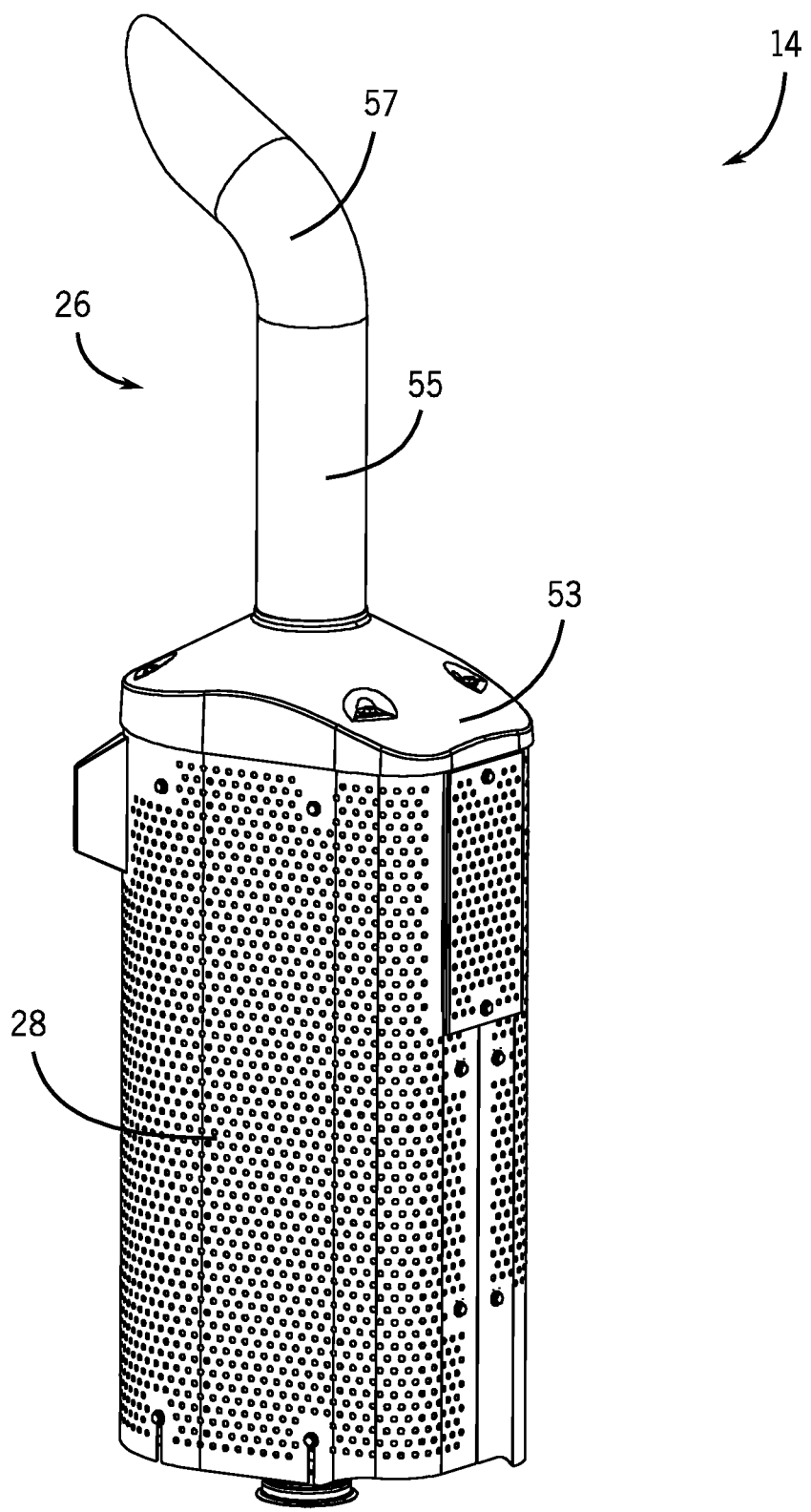
FIG. 3 is a perspective view of an embodiment of an exhaust system that may be used within the off-road work vehicle of FIG. 1.

FIG. 3 is a perspective view of an embodiment of an exhaust system that may be used within the off-road vehicle of FIG. 1. In the depicted embodiment, the outlet stack 26 is cylindrical and configured to direct a flow of exhaust gas from the outlet port 62 toward a distal end of the outlet stack 26. It should be appreciated, that any hollow shape that facilitates exhaust flow may be used. In the depicted embodiments, the outlet stack 26 includes a base 53 extending radially from a tube 55. The tube 55 extends upwardly from the base 53, and the base 53 is sloped away from the tube 55. As illustrated, a tip 57 of the tube 55 is bent to block precipitation flow into the outlet stack 26. In addition, the tip 57 is beveled to further reduce flow of foreign substances, such as moisture and debris, into the exhaust system 14.

The depicted exhaust shield 28 surrounds a portion of the exhaust system 14. The shape and/or size of the exhaust shield 28 may be defined by government homologation requirements. The exhaust shield 28 may include at least one opening/perforation configured to aspirate air from outside the exhaust system into the exhaust system. In certain embodiments, the perforations in the exhaust shield 28 may be particularly arranged to provide different airflows to different areas of the exhaust system. For example, more airflow may be provided to hotter regions to provide enhanced cooling.

Figure 4:
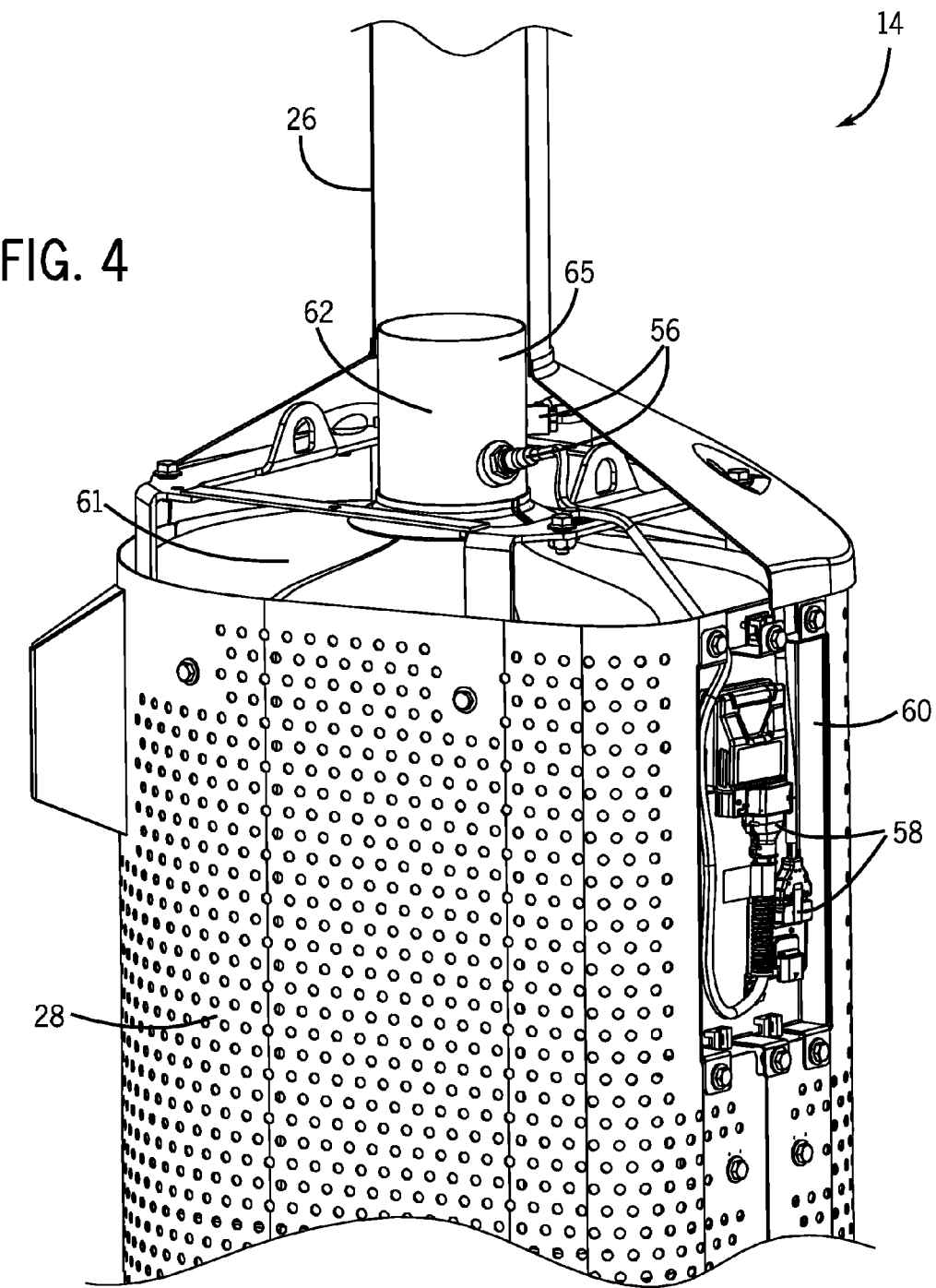
FIG. 4 is a partial cross-sectional view of the exhaust system of FIG. 3, showing the placement of the outlet port, sensors, and electronic control unit.

FIG. 4 is a partial cross-sectional view of the exhaust system of FIG. 3, showing the placement of the outlet port, sensors, and electronic control unit. As illustrated, the exhaust system 14 includes an outlet port 62 configured to release exhaust gas. A housing 65 includes a body 61 and an outlet port 62 extending upwardly from the body 61. As described above, the ECUs 58 may be positioned proximate to the sensors 56, which places the ECUs 58 proximate to heat sources in the exhaust system 14. In the depicted embodiment, the ECUs 58 are coupled to the exhaust shield 28 using a separate mounting bracket 60. The separate mounting bracket 60 facilitates assembly of the exhaust system 14, enhances access to the ECUs 58, and enhances appearance (e.g., by obviating visible clamps). It should be appreciated that a cover with at least one opening may be placed over the ECUs 58 to provide access and cooling. In addition, ducting may be added between the exhaust shield 28 and the ECUs 58 to enhance airflow to the ECUs 58. Because the illustrated embodiment provides a cooling airflow to the ECU, the quantity and/or thickness of reflective heat insulation may be reduced, thereby reducing the part count, part cost, and overall weight of the exhaust system.

In the depicted embodiment, the sensors 56 are coupled to the outlet port 62, thereby enabling the sensors 56 to monitor a level of at least one component of the exhaust gas as it leaves the outlet port 62. As illustrated, the sensors 56 are placed at a downward slant to reduce the possibility that moisture from the outlet stack 26 contacts the sensors 56. In addition, the wiring that connects the sensors 56 to the ECUs 58 is disposed behind the exhaust shield 28 and the outlet stack 26, which protects the wiring and enhances the appearance of the exhaust system 14.

Figure 5:
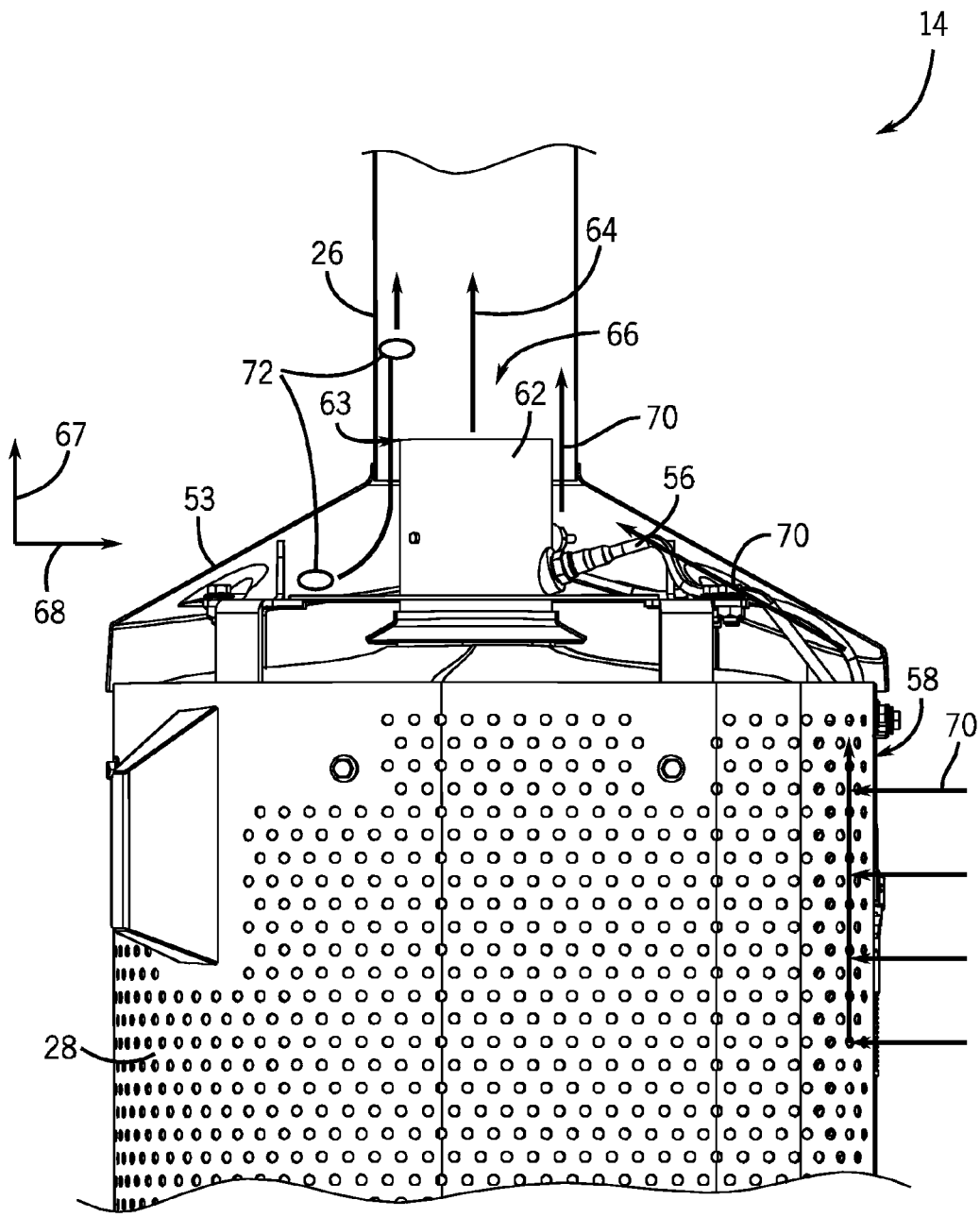
FIG. 5 is a cross-sectional view of the exhaust system of FIG. 3, showing an airflow path through the exhaust system.

FIG. 5 is a cross-sectional view of the exhaust system of FIG. 3, showing an airflow path through the exhaust system. The outlet stack 26, as described above, may be any hollow shape that enables exhaust gas to flow from the outlet port 62 to the environment. For example, exhaust gas may flow from the ATS 33, through the outlet port 62, and into the outlet stack 26. Similar to the outlet stack 26, the depicted outlet port 62 is cylindrical. However, it should be apparent that any hollow shape may be used in alternative embodiments. In the depicted embodiment, the outlet stack 26 is disposed about the outlet port 62, in which at least a portion of the outlet stack 26 is radially 68 spaced from the outlet port 62 to form a gap 63 between the outlet stack 26 and the outlet port 62. In other words, the outlet stack 26 at least partially surrounds the outlet port 62, and the cross section of the outlet stack 26 is larger than the cross section of the outlet port 62. It should be appreciated that different sizes and/or shapes of the outlet port 62 and the outlet stack 26 may be utilized to vary air flow through the exhaust system 14. For example, a larger difference in cross-sectional area provides higher pressure airflow through the exhaust system, and a smaller difference in cross-sectional area provides higher velocity airflow through the exhaust system. In the depicted embodiment, the outlet port 62 and the outlet stack 26 are aligned with one another along an axial direction 67. In addition, the outlet stack 26 is spaced from the outlet port 62 in the radial direction 68. In other words, the outlet stack 26 and the outlet port 62 have the same center, but have different radii. It should also be appreciated that in other configurations, the outlet stack 26 and the outlet port 62 are not axially aligned. In fact, some possible configurations may have the outlet port 62 partially connected to the outlet stack 26 to vary airflow.

As previously discussed, the exhaust system 14 includes a perforated exhaust shield 28 with at least one opening. The perforations enable cooler air from outside the exhaust system 14 to pass through the exhaust shield 28 and into the exhaust system 14. As mentioned above, the size, shape, and/or number of perforations may be particularly selected to enhance air flow in certain areas.

As described above, the release of exhaust gas 64 from the outlet port 62 aspirates air through the exhaust system 14. As the exhaust gas 64 flows from the smaller outlet port 62 into the larger outlet stack 26, a low pressure region 66 is formed in the outlet stack 26. The low pressure region 66 draws cooler air from outside the exhaust system 14 through the at least one opening in the exhaust shield 28, over the ECUs 58, through the gap 63, and to the low pressure region 66 downstream of the outlet port 62. The airflow from upstream of the outlet port 62 cools the outlet port 62, the outlet stack 26, the exhaust gas 64, and regions upstream of the outlet port 62. Because the ECUs 58 and sensors 56 are positioned upstream of the outlet port along the airflow path from the perforations to the gap, the airflow cools the ECUs 58 and sensors 56, thereby reducing the operating temperature to a desired level. The flow of air through the exhaust system 14 is visually represented in FIG. 5 with arrows 70. Once the air reaches the low pressure region 66, it mixes with the exhaust gas 64 and exits the exhaust system through the exhaust stack 26. It should be appreciated that the air flow through the exhaust system 14 may be adjusted by varying the size and/or shape of the gap 63. In addition, one or more nozzles may be added to the outlet stack 26 to adjust the airflow.

In addition to the cooling effect, the air flow through the exhaust system 14 removes foreign debris 72 that collects in the exhaust system 14. The debris 72 may include dust and/or plant particles. The debris 72 may enter the exhaust system 14 either through the outlet stack 26 or the exhaust shield 28. As the air flows through the exhaust system 14 (e.g. along the path 70 described above), the air captures debris 72. The debris 72 then exits the outlet stack 26 along with the exhaust gas 64. Because the airflow removes debris from the exhaust system, the interval between exhaust system cleanings may be increased, thereby reducing maintenance costs. In other words, the outlet stack 26 and outlet port 62 form a self-cleaning exhaust system. The slanted base 53 of the exhaust stack 26 also facilitates removal of foreign debris 72 from the exhaust system by directing the debris toward the outlet stack 26 and/or the ground.

Figure 6:
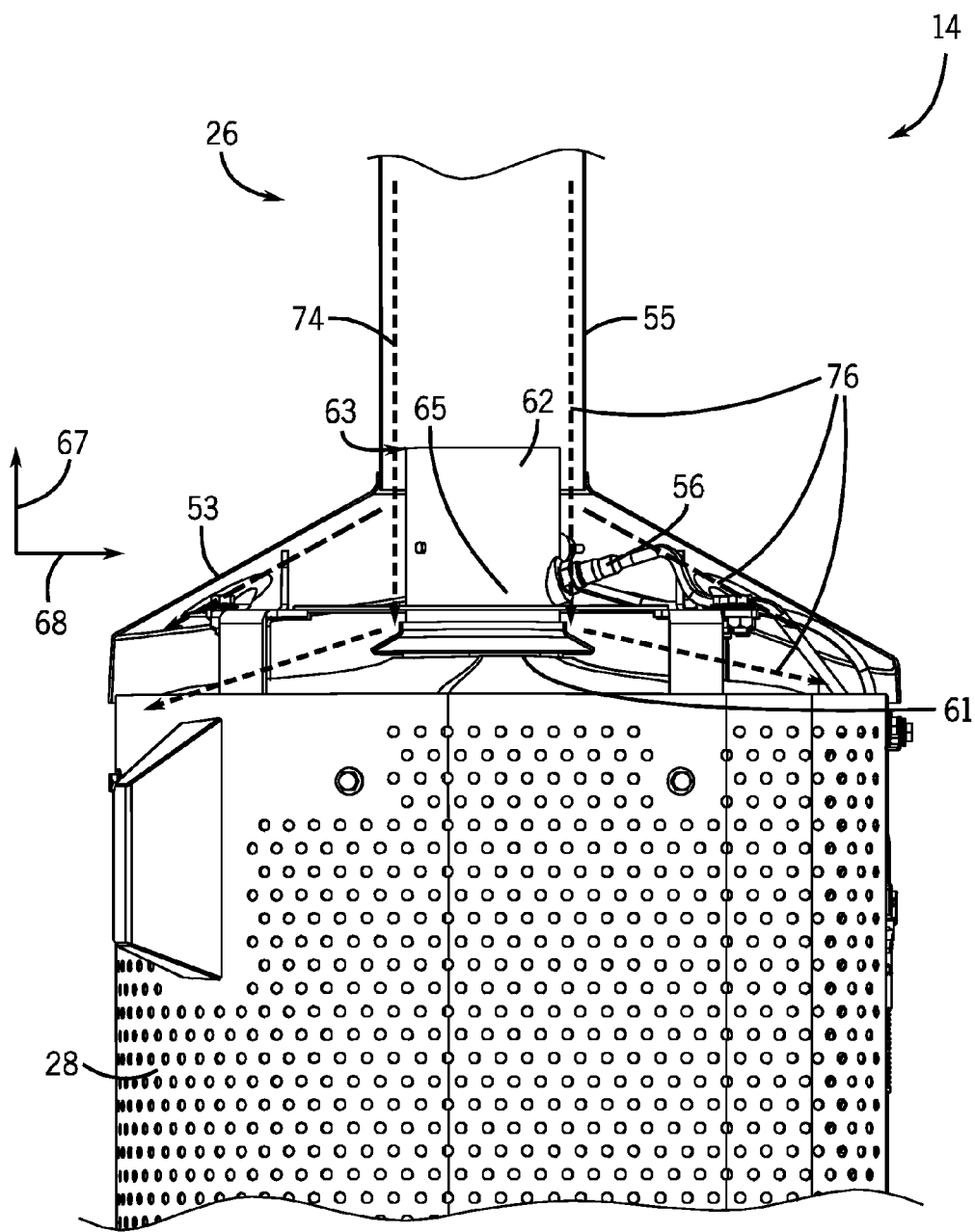
FIG. 6 is a cross-sectional view of the exhaust system of FIG. 3, showing a water flow path through the exhaust system.

FIG. 6 is a cross-sectional view of the exhaust system of FIG. 3, showing a water flow path through the exhaust system 14. As described above, the outlet stack 26 is disposed about the outlet port 62 with a gap 63 between them. In the depicted embodiment, the housing 65 includes the body 61 and the outlet port 62 extending upwardly from the body 61. The outlet stack 26 includes a base 53 extending radially outward 68 beyond the body 61 of the outlet port 62, and a tube 55 extending upwardly from the base. As illustrated, the base 53 is sloped away from the tube 55. In some embodiments, the base 53 of the outlet stack 26 may be connected to the exhaust shield 28. In addition, the outlet port 62 and the outlet stack 26 are aligned with one another along an axial direction 67. The outlet stack 26 is spaced from the outlet port 62 in the radial direction 68. It should also be appreciated that in other configurations, the outlet stack 26 and the outlet port 62 are not axially aligned. In the illustrated embodiment, the gap 63 extends about the entire perimeter of the outlet port 62 to facilitate water flow through the gap 63. In addition, the outlet stack 26 may be beveled at its tip 57, as shown in FIG. 3, to block moisture from falling directly down into the outlet port 62.

As described above, moisture may enter the exhaust system 14 through the outlet stack 26. If water contacts the sensors 56, the moisture may interfere with the emission measurements. In the depicted embodiment, because the tip 57 of outlet stack 26 is beveled, moisture flow through the center of the outlet stack 26 is blocked. However, moisture may adhere to the walls 74 of the outlet stack 26 and flow downwardly toward the outlet port 62. As gravity pulls the moisture down, the gap 63 facilitates flow of moisture from an inner surface of the tube 55 to an inner surface of the base 53. At the base 53 of the outlet stack 26, the moisture either breaks its bond with the walls 74 and falls or continues along the slanted base 53 until the moisture reaches the exhaust shield 28. The potential paths of the moisture are shown with arrows 76. The moisture then either evaporates or falls out of the bottom of the exhaust system 14. In either case, the moisture is kept out of the outlet port 62 and away from the moisture-sensitive sensors 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An exhaust system for an off-road vehicle comprising:
a housing comprising a body and an outlet port extending upwardly from the body, wherein the body extends radially outward beyond the outlet port, and the outlet port is configured to release exhaust gas;
an exhaust shield disposed about the body, wherein the exhaust shield comprises at least one opening configured to enable cooling air to flow from outside the off-road vehicle directly into the exhaust system;
an electronic control unit (ECU) disposed within the exhaust shield; and
an outlet stack disposed about the outlet port such that at least a portion of the outlet stack is radially spaced from the outlet port to form a gap between the outlet stack and the outlet port, wherein the outlet stack is configured to:
receive the exhaust gas from the outlet port to establish a low pressure region in the outlet stack that aspirates the cooling air through the at least one opening, over the ECU, and into the outlet stack; and
direct flow of the exhaust gas and the cooling air toward a distal end of the outlet stack.

2. The exhaust system of claim 1, comprising a sensor configured to monitor a level of at least one component of the exhaust gas, wherein the sensor is positioned upstream of the outlet port.

3. The exhaust system of claim 2, wherein the ECU is communicatively coupled to the sensor.

4. The exhaust system of claim 1, comprising an after-treatment system (ATS) configured to reduce a level of at least one component of the exhaust gas, wherein the ATS is positioned upstream of the outlet port.

5. The exhaust system of claim 1, wherein the outlet stack and the outlet port are substantially axially aligned with one another.

6. The exhaust system of claim 1, wherein the outlet stack comprises a nozzle configured to facilitate adjustment of a velocity of the cooling air through the at least one opening, over the ECU, and into the outlet stack.

7. The exhaust system of claim 1, wherein the outlet stack is configured to receive the exhaust gas from the outlet port such that the cooling air carries debris from around the housing through the gap, through the outlet stack, and to a region outside the off-road vehicle.

8. The exhaust system of claim 1, wherein the outlet stack comprises a sloped base, wherein the sloped base is configured to direct the cooling air through the gap.

9. An exhaust system for an off-road vehicle comprising:
an outlet port configured to release exhaust gas;
an outlet stack disposed about the outlet port, wherein at least a portion of the outlet stack is radially spaced from the outlet port to form a gap between the outlet stack and the outlet port, and the outlet stack is configured to receive the exhaust gas from the outlet port;
wherein the outlet stack is configured to direct the exhaust gas toward a distal end to establish a low pressure region that draws cooling air directly from outside the off-road vehicle through one or more openings in the exhaust system, over an electronic control unit (ECU), and through the gap into the outlet stack.

10. The exhaust system of claim 9, comprising a sensor configured to monitor a level of at least one component of the exhaust gas, wherein the sensor is positioned upstream of the outlet port.

11. The exhaust system of claim 10, wherein the ECU is communicatively coupled to the sensor.

12. The exhaust system of claim 9, wherein the outlet stack and the outlet port are substantially axially aligned with one another.

13. The exhaust system of claim 9, wherein the outlet stack comprises a nozzle configured to facilitate adjustment of a velocity of the cooling air through the at least one opening, over the ECU, and into the outlet stack.

14. The exhaust system of claim 9, wherein the gap is configured to enable the low pressure region to draw the cooling air into the outlet stack such that the cooling air carries debris from around outlet port, through the gap, through the outlet stack, and out of the exhaust system.

* * * * *